US010078006B2

(12) United States Patent
Hald

(10) Patent No.: US 10,078,006 B2
(45) Date of Patent: Sep. 18, 2018

(54) WIDE-BAND ACOUSTIC HOLOGRAPHY

(71) Applicant: BRÜEL KJÆR SOUND & VIBRATION MEASUREMENT A/S, Nærum (DK)

(72) Inventor: Jørgen Hald, Fredensborg (DK)

(73) Assignee: Brüel & Kjær Sound & Vibration Measurement A/S, Nærum (DK)

(*) Notice: Subject to any disclaimer, the term of this patent is extended or adjusted under 35 U.S.C. 154(b) by 290 days.

(21) Appl. No.: 14/906,063

(22) PCT Filed: Jun. 26, 2014

(86) PCT No.: PCT/EP2014/063597
§ 371 (c)(1),
(2) Date: Jan. 19, 2016

(87) PCT Pub. No.: WO2015/010850
PCT Pub. Date: Jan. 29, 2015

(65) Prior Publication Data
US 2016/0161325 A1 Jun. 9, 2016

(30) Foreign Application Priority Data
Jul. 22, 2013 (EP) .................................. 13177409

(51) Int. Cl.
*H04B 15/00* (2006.01)
*H04R 29/00* (2006.01)
(Continued)

(52) U.S. Cl.
CPC ............. *G01H 9/002* (2013.01); *G01V 1/001* (2013.01); *G03H 3/00* (2013.01)

(58) Field of Classification Search
CPC ........... G03H 3/00; G01H 9/002; G01V 1/001
(Continued)

(56) References Cited

U.S. PATENT DOCUMENTS 7,289,633 B2 * 10/2007 Metcalf .................... H04S 7/30
359/901
8,731,851 B2 * 5/2014 Hald .................... G01H 3/125
702/56
(Continued)

FOREIGN PATENT DOCUMENTS

CN 101617245 A 12/2009
CN 101910807 A 12/2010
(Continued)

OTHER PUBLICATIONS

Cetin et al: "A Variational Technique for Source Localization Based on a Sparse Signal Reconstruction Perspective", Proceedings of the 2002 IEEE International Conference on Acoustics, Speech, and Signal Processing, Orlando, FL, May 2002 (4 pages).
(Continued)

Primary Examiner — Xu Mei
(74) Attorney, Agent, or Firm — Nixon Peabody LLP

(57) ABSTRACT

A method of determining a property of a sound field from a plurality of measured sound field parameters, the method comprising: receiving a plurality of measured sound field parameters each indicative of a sound field parameter measured by a sensor of an array of sensors, the sensor being positioned at a measurement position; providing a model of a sound field, the model comprising a set of elementary waves and having associated with it a set of model parameters; computing, from the model, computed values of the sound field parameter at each of the measurement positions and as a function of said model parameters; determining a set of parameter values of the model parameters so as to reduce an error measure by performing an iterative minimization process including a plurality of iterations, the error measure comprising an error term operable to compare the computed and the measured sound field parameters; com- (Continued)

puting the property of the sound field from the determined set of model parameters.

14 Claims, 1 Drawing Sheet

(51) Int. Cl.
   *G01H 9/00* (2006.01)
   *G01V 1/00* (2006.01)
   *G03H 3/00* (2006.01)

(58) Field of Classification Search
   USPC .............. 381/56, 80, 91, 92, 122, 94.1–94.3; 367/7, 8
   See application file for complete search history.

(56) References Cited

U.S. PATENT DOCUMENTS

| | | | |
|---|---|---|---|
| 8,848,481 B2* | 9/2014 | Hald | G01H 3/125 367/7 |
| 2004/0151066 A1 | 8/2004 | Kim | |
| 2006/0098534 A1* | 5/2006 | Hickling | G01S 3/8006 367/124 |
| 2011/0051952 A1 | 3/2011 | Ohashi | |
| 2011/0075860 A1* | 3/2011 | Nakagawa | G01H 3/00 381/94.1 |
| 2014/0133664 A1* | 5/2014 | Beaty | H04S 7/40 381/56 |
| 2014/0307894 A1* | 10/2014 | Kordon | H04R 3/005 381/92 |

FOREIGN PATENT DOCUMENTS

| | | |
|---|---|---|
| CN | 102089633 A | 6/2011 |
| CN | 102089634 A | 6/2011 |
| CN | 103135094 A | 6/2013 |
| CN | 103207380 A | 7/2013 |
| EP | 2202531 | 6/2010 |
| WO | WO 2010/003836 | 1/2010 |
| WO | WO 2010/003837 | 1/2010 |
| WO | WO 2013/064628 | 5/2013 |

OTHER PUBLICATIONS

J. Hald: "Basic Theory and Properties of Statistically Optimized Near-Field Acoustical Holography". The Journal of The Acoustical Society of America, American Institute of Physics for The Acoustical Society of America, New York, NY, US., vol. 125, No. 4, Apr. 1, 2009 (16 pages).
Jerome Antoni "A Bayesian Approach to Sound Source Reconstruction: Optimal Basis, Regularization, and Focusing" J. Acoust. Soc. Am. 131 (4), Apr. 2012 (18 pages).
Nam et al. "A Partial Field Decomposition Algorithm and its Examples for Near-Field Acoustic Holography" The Journal of The Acoustical Society of America, American Institute of Physics for The Acoustical Society of America, New York, NY, vol. 116, No. 1, Jul. 31, 2004 (pp. 172-185).
Nam et al. "Visualization of Multiple Incoherent Sources by the Backward Prediction of Near-Field Acoustic Holography" The Journal of The Acoustical Society of America, American Institute of Physics for The Acoustical Society of America, New York, NY, vol. 109, No. 5, May 31, 2001 (pp. 1808-1816).
Takao Suzuki "Generalized Inverse Beam-forming Algorithm Resolving Coherent/Incoherent, Distributed and Multipole Sources" 14th AIAA/CEAS Aeroacoustics Conference (29th AIAA Aeroacoustics Conference) May 5-7, 2008, Vancouver, Canada (16 pages).
Wang et al: "Helmholtz Equation-Least-Squares Method for Reconstructing the Acoustic Pressure Field" The Journal of The Acoustical Society of America, vol. 102, No. 4, Jan. 10, 1997 (pp. 2020-2032).
Zavala et al: "Generalized Inverse Beam Forming Investigation and Hybrid Estimation" Berlin Beam Forming Conference Feb. 24-25, 2010, BeBe—Oct. 2010 (12 pages).
International Search Report, PCT/EP2014/063597, dated Feb. 18, 2015 (4 pages).
Written Opinion of the International Searching Authority, PCT/EP2014/063597, dated Feb. 18, 2015 (9 pages).
The State Intellectual Property Office of the People's Republic of China, Search Report in Chinese Patent Application No. 2014800519914, dated Feb. 22, 2018 (2 pages).

* cited by examiner

WIDE-BAND ACOUSTIC HOLOGRAPHY

CROSS-REFERENCE TO RELATED APPLICATIONS

This application is a U.S. National Stage of International Application No. PCT/EP2014/063597, filed Jun. 26, 2014, which claims the benefit of European Patent Application No. 13177409.3, filed Jul. 22, 2013, both of which are incorporated herein by reference in their entireties.

TECHNICAL FIELD

The present invention relates to array signal processing of acoustic signals, e.g. acoustic holography.

BACKGROUND

Acoustic holography is a widely used technique for the estimation of a source or sound field, in particular a sound field near the source. Acoustic holography techniques typically involve a measurement of acoustic parameters away from the source via a sensor array, e.g. an array of pressure and/or particle velocity transducers. Measuring techniques included within acoustic holography are becoming increasingly popular in various fields, most notably those of transportation, vehicle and aircraft design, white goods design, NVH (Noise, vibration, and harshness), or similar applications.

Known acoustic holography methods include the statistically optimal near-field acoustic holography (SONAH) and the equivalent source method (ESM). For example, J. Hald, "Basic theory and properties of statistically optimized near-field acoustical holography", J. Acoust. Soc. Am. 125 (4), April 2009, describes the SONAH method.

However, under certain measurement conditions, prior art methods like the above have a tendency of resulting in severe ghost sources, i.e. they indicate the presence of spurious sources, thus reducing the reliability of these prior art methods for sound source localization or the estimation of the sound field at positions other than the measurement positions. Moreover, prior art methods like the above have a tendency of estimating values that are too low compared to the correct values. One example of measurement conditions where such undesired artifacts occur are measurements with an irregular array with average microphone spacing larger than half a wavelength of the sound waves to be investigated. In such cases the estimation problem will be at least close to ambiguous and heavily underdetermined.

Due to the cost of microphones (or other sensors) and data/signal acquisition hardware, it is generally desirable to use as few sensors as possible in a sensor array. It is thus generally desirable to provide a method for estimating a sound field from measured acoustic parameters obtained from an array of sensors that provides an improved accuracy of the estimated sound field even at high frequencies, e.g. when the average sensor spacing of the sensor array is larger than half the wavelength of the sound field under investigation.

SUMMARY

Disclosed herein is a method of determining at least one property of a sound field from a plurality of measured sound field parameters obtained from an array of sensors, the method comprising:

receiving a plurality of measured sound field parameters each indicative of a sound field parameter at a measurement position;

providing a model of a sound field, the model comprising a set of elementary waves and having associated with it a set of model parameters, the set of model parameters comprising a set of magnitude parameters each indicative of a magnitude of one of the elementary waves;

computing, from the model, computed values of the sound field parameter at each of the measurement positions and as a function of said model parameters;

determining a set of parameter values of the model parameters so as to reduce an error measure by performing an iterative minimization process including a plurality of iterations, the error measure comprising an error term operable to compare the computed values and the measured sound field parameters; and computing the property of the sound field from the determined set of model parameters;

wherein determining comprises, at one or more current iterations of the iterative minimization process:

computing a set of current values of the model parameters from at least a set of previous values of the model parameters, the previous values resulting from a previous iteration of the iterative process;

selecting a subset of elementary waves from said set of elementary waves, adjusting the computed current values of the model parameters so as to suppress a magnitude of all elementary waves other than the selected subset of elementary waves Embodiments of the method disclosed herein thus seek to remove or at least suppress ghost sources or other ghost wave solutions by repeatedly pruning the set of elementary waves employed in the sound field model that is used to estimate the sound field from measured acoustic parameters. The suppression of the magnitude of the elementary waves other than the selected sources/wave solutions may be performed by setting their magnitude to zero, i.e. by setting the values of the source magnitude parameters or other magnitude parameter associated with the non-selected sources/wave solutions to zero. In alternative embodiments, the values of the source magnitude parameters or other magnitude parameters may be divided by a large suppression factor, or their magnitude may be otherwise reduced. The thus adjusted current values will then be used in the subsequent iteration as corresponding previous values of the model parameters.

The inventors have realized that the ghost sources or ghost wave contributions are typically weaker than the underlying real source(s) or real wave contributions. Consequently, in some embodiments, selecting the subset of elementary waves comprises selecting the sources or elementary waves having a magnitude larger than a selection threshold. The magnitude may be the amplitude or another suitable measure of the strength of the elementary waves. In some embodiments, the magnitude parameter is a complex amplitude having a real part and an imaginary part, i.e. the complex amplitude may represent a real amplitude and a phase. In some embodiments, a source model at infinite distance is used. In that case each elementary wave produces an incident plane wave, and the magnitude may be the magnitude of the complex amplitudes of the respective plane waves. Generally, examples of elementary waves include spherical waves, plane waves, duct modes etc. A spherical wave may emanate from a point source, e.g. a monopole, dipole, or a multipole.

Generally, embodiments of the method described herein use a model of a sound field represented by a set of elementary wave functions; the process then solves an inverse problem to compute the complex amplitudes of the elementary waves. The model of the sound field including the computed complex amplitudes may then be applied for a 3D reconstruction of the sound field. In some embodiments, the provided model of a sound field is a coherent model representative of respective coherent contributions to a sound field; respective contributions may be modelled as respective elementary waves, each elementary wave represented by an amplitude and a phase. Consequently, embodiments of the method described herein are not limited to the analysis of incoherent sound fields but allow the analysis of sound fields including multiple coherent contributions. In some embodiments, e.g. when the sound field results from multiple uncorrelated sources, the method may comprise determining an averaged cross spectral matrix and computing the computed values of the sound field parameters may be performed in respect of respective principal components of the averaged cross spectral matrix. In another embodiment, the process comprises obtaining reference measurements of one or more reference transducers and determining the measured sound field parameters as respective partial sound field parameters each coherent with one of the reference measurements.

In some embodiments, each of the received measured sound field parameters may be indicative of an actual measurement by a sensor or, in other embodiments, of a sound field parameter at the sensor position which sound field parameter is derived from actual measurements. In some embodiments, the measured sound field parameters are each indicative of a sound field parameter measured by a sensor of an array of sensors, the sensor being positioned at a measurement position. In some embodiments, the received measured sound field parameters are obtained by preprocessing the measurements from the sensors, e.g. by computing principal components of averaged cross spectral matrix of the measurements, e.g. of the sound pressure detected by the sensors. Hence, embodiments of the method obtain, from respective measurements by sensors of an array of sensors, the sensors being positioned at respective measurement positions, a plurality of measured sound field parameters each indicative of a sound field parameter at a measurement position.

In some embodiments, the process receives a set of complex sound pressures each associated with one measurement position. The sound pressures may be obtained by a signal processing step that may involve measurements from multiple microphones. For example, the signal processing may include averaging the cross-spectral matrix between microphones and the computation of principal components. In other embodiments, the signal processing may include the use of one or more reference transducers (e.g. microphones or accelerometers) different from the array of microphones.

If a single reference transducer is used, the auto-spectrum of the reference signal and the cross-spectra between the reference signal and each of the array microphones are determined. The sound pressure in respect of a given microphone is then computed the reference auto-spectrum and the cross-spectrum between the reference transducer and said microphone.

If multiple reference transducers are used, the cross-spectral matrix between all reference transducers and the cross-spectral matrix between the reference transducers and the measurement microphones are determined. A principal component decomposition of the cross-spectral matrix between the reference transducers is performed The principal component decomposition is then used together with the reference-to-microphone-array cross-spectral matrix to compute the sound pressure that serves as input to the process.

The selection threshold may be an absolute threshold or a relative threshold, e.g. relative to the strongest of the set of elementary waves. A relative threshold may e.g. be defined as a permitted dynamic range, e.g. as predetermined number of decibels below the strongest of the elementary waves. Hence, in some embodiments the elementary waves included in the selected subset are selected so as to limit the dynamic range of the subset of elementary waves.

While the selection threshold may be constant during the iteration process, in some embodiments, the selection threshold is updated during the iteration process. In some embodiments the selection threshold is updated so as to allow an increasing dynamic range of elementary waves in the selected subset. Hence, in some embodiments the limitation on the dynamic range of the selected elementary waves is iteratively reduced and, in some embodiments, eventually removed. As mentioned above, for each real source, prior art array methods tend to introduce related ghost sources which are typically weaker than the related real source. Embodiments of the method disclosed herein initially model the sound field using only a limited set of one or more strong sources/elementary waves (all other elementary waves being set to zero). Once the contributions to the residual error that relate to these sources are removed (or at least substantially reduced) during the iterative process, weaker sources may be added to the model, i.e. the selected subset of sources is gradually increased to also include weaker sources. The inventors have realized that, once approximate solutions to the strongest sources have been established, the risk of ghost sources relating to these strong sources being re-introduced is small.

In some embodiments the magnitude of the initially selected elementary waves are set to an initial starting value, e.g. equal to zero, and the selection threshold is set to an initial value. As mentioned above, in some embodiments, the selection threshold may be a relative threshold, relative to the strongest elementary wave. Hence, the initial value of the selection threshold may be expressed as the initially permitted dynamic range relative to the strongest elementary wave. During the subsequent iterations, the selection threshold may be set so as to cause the permitted dynamic range to gradually increase until it reaches a predetermined maximum value.

It will be appreciated that the selection of elementary waves may be updated at each iteration step of the iterative minimization process or only at a subset of iterations. Similarly, the permitted dynamic range may be updated at each iteration step of the iterative minimization process or only at a subset of iterations. For example, in some embodiments, during each iteration (e.g. after each steepest descent step of a steepest-descent residual minimization process,) all sources having a magnitude below the selection threshold are set to zero, and the next iteration step starts at a point in solution space where the selected strongest sources have the values determined during the previous step, while the weakest sources are set to zero. The selection threshold may e.g. be set such that the permitted dynamic range is increased after each step or such that the permitted dynamic range is increased every time a certain number of steps have been performed. In alternative embodiments, after having set the weakest sources to zero, a number of iteration steps may be performed only with the selected subset of sources (i.e. in a reduced solution space). The number of iterations to be performed only with the selected subset of sources included in the model may be a predetermined number, or the number of iterations may be determined during the process by a given termination criterion. In any event, after having performed said number of iterations, only using the selected subset of strongest sources, the sources that have previously been set to zero may be reintroduced into the model. This shifting between subset iterations and full-set iterations may be repeated several times.

In some embodiments, the process updates the selection threshold such that the permitted dynamic range is increased until a predetermined dynamic-range criterion is fulfilled. The method may then proceed without further pruning of the elementary waves or with a pruning based on a constant dynamic range. In some embodiments, the process uses a first minimization algorithm for reducing the error measure at least until the dynamic-range criterion is fulfilled. In particular, the first algorithm includes a first update rule for selecting an updated approximation of the model parameters from the current approximation of the model parameters and from the error measure. After the dynamic-range criterion is fulfilled, the process may continue to use the first minimization algorithm or switch to a second, different minimization algorithm. In particular, the second algorithm includes a second update rule, different from the first update rule, for selecting an updated approximation of the model parameters from the current approximation of the model parameters and from the error measure. For example, the first minimization algorithm may be a steepest descent algorithm and the second minimization algorithm may be a conjugate gradient algorithm.

The model parameters may include the positions of the selected subset of elementary sources, the magnitude of each elementary source or elementary wave, and/or other parameters describing properties of the elementary source or other elementary waves. The magnitude may e.g. be expressed as a complex amplitude. Providing the model may thus include selecting initial values of the number and locations of the elementary sources. Providing the model may further include selecting a type of elementary wave, e.g. plane wave, spherical wave, etc. and/or selecting a type of elementary source, such as monopole and/or dipole point sources, and/or other properties of the elementary waves, such as initial values of their amplitudes. When the elementary waves represent sources at infinite distance, the model parameters may include incident directions of respective incident plane waves, i.e. the incident direction represents the position of the elementary source.

The model may comprise one or more functions, dependent on said model parameters, and allowing computation of the sound field parameters at selected target positions. Computing computed values of the sound field parameter may thus comprise evaluating said one or more functions at each of the measurement positions and as a function of said model parameters. Generally, the terms computing values at a target position and evaluating a function at a target position are intended to refer to the computation of a value where the value is indicative of a parameter value or a function value at said target position. It will be appreciated that the computation may be performed at a different position.

In some embodiments, the error measure further comprises a regularization term, e.g. a regularization term operable to reduce the magnitude of a solution vector of the solution of the iterative minimization process. For example, the regularization term may be a function indicative of a norm of a solution vector of elementary wave magnitudes.

The measured sound field parameter may be an acoustic quantity, e.g. a sound pressure, a sound pressure gradient, a particle velocity, and/or the like. Accordingly each sensor may be any suitable acoustic measuring device, e.g. a microphone, a hydrophone, a pressure gradient transducer, a particle velocity transducer, etc. or a combination thereof. The sensor array comprises a plurality of sensors, e.g. a set of sensors arranged in a regular or irregular grid, for example, a two- or three-dimensional grid.

The sensors of the array are arranged at respective ones of a set of measurement positions. The set of measurement positions may be arranged in one or more measurement planes, e.g. in a single plane or in two or more parallel planes. Within each plane, the measurement positions may be arranged on a regular grid, in an irregular pattern, or in any other suitable way. Furthermore, the method described herein may also be applied to non-planar measurement geometries, i.e. arrangements where the measurement positions are not located in one or more parallel planes, but e.g. on a curved surface. For example, the method described herein may be applied to spherical array geometries.

The iterative minimization process may be performed until a suitable completion criterion is obtained e.g. until the error measure is below a predetermined threshold. At each iteration, the process may adjust current values of the model parameters according to a suitable update rule so as to reduce the error measure, e.g. according to a suitable error descent process, such as a steepest descent technique. The result of the iterative minimization process may thus include the resulting values of the model parameters including, in particular, the magnitudes of the elementary waves obtained by the process when the completion criterion is fulfilled. From the resulting model parameter values obtained at the end of the iterative process, the process may thus output computed sound field parameters at selected target positions and/or output the location and/or magnitude of the resulting elementary sound sources. The process may store the obtained model parameters. Alternatively or additionally, the process may output the result of the iterative process in another suitable way, e.g. by displaying a representation of the computed sound field parameters as a function of position coordinates. The property of the sound field output by the process may be the locations and magnitudes of one or more of the resulting subset of elementary waves. Alternatively/or additionally the property may be computed sound field parameters, such as sound pressure, particle velocity, sound pressure gradient, sound intensity, etc., at one or multiple target positions.

It is noted that features of the method described above and in the following may be implemented at least in part in software or firmware and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), Graphical Processing Units (GPU), Central Processing Unit (CPU), special purpose electronic circuits, etc., or a combination thereof.

Embodiments of the present invention can be implemented in different ways, including the method described above and in the following, corresponding systems, devices and products, each yielding one or more of the benefits and advantages described in connection with the first-mentioned aspect, and each having one or more embodiments corresponding to the embodiments described in connection with the first-mentioned aspect and/or as disclosed in the dependent claims or the present description.

In particular, disclosed herein are embodiments of a processing apparatus for determining at least one property of a sound field from a plurality of measured sound field parameters obtained from an array of sensors. The processing apparatus comprises an interface for receiving, from respective sensors of a sensor array, a set of sensor output signals responsive to a measured sound field parameter; and a processing unit configured to perform the steps of an embodiment of the method defined herein. The processing apparatus may further comprise a storage medium for storing model parameters of a determined solution of an iterative minimization process as described herein and/or another output interface for outputting the model parameters and/or a computed property of a sound field, computed from the computed model parameters. Examples of output interfaces comprise a display, a communications interface for data communications, and/or the like.

An acoustic measurement system may comprise a processing apparatus as described above and in the following, and a set of sensors for measuring a sound field parameter at a set of measurement positions, and connectable in communication connection to the processing apparatus so as to forward the measured sound field parameter to the processing apparatus. For example, such a system may be used for localizing sound (e.g. noise) sources in 3D space, e.g. for localizing sound sources in an enclosure or on an engine. The sensor array may forward the sensor output in analogue or in digital form. Accordingly, some or all of a number of signal processing steps, such as amplification, filtering, analogue-to-digital conversion, and/or the like may be performed by the sensor array or by the processing apparatus.

A computer program may comprise program code means adapted to cause a data processing system to perform the steps of the method disclosed above and in the following when the program code means are executed on the data processing system. The computer program may be stored on a computer-readable storage medium or embodied as a data signal. The storage medium may comprise any suitable circuitry or device for storing data, such as a RAM, a ROM, an EPROM, EEPROM, flash memory, magnetic or optical storage device, such as a CD ROM, a DVD, a hard disk, a solid state disk (SSD), and/or the like.

BRIEF DESCRIPTION OF THE DRAWINGS

The above and other aspects will be apparent and elucidated from the embodiments described in the following with reference to the drawing in which.

Throughout the drawings, equal reference signs refer to equal or corresponding elements, features, or components, wherever feasible.

DETAILED DESCRIPTION

Figure 1:
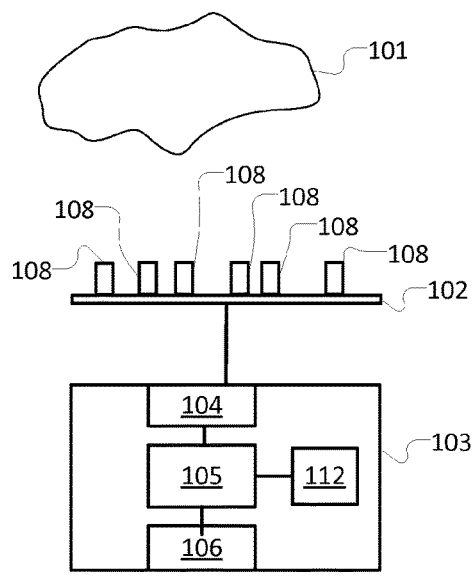
FIG. 1 shows a schematic block diagram of an acoustic measurement system.

FIG. 1 shows a schematic block diagram of an acoustic measurement system. The system comprises a sensor array 102 comprising a set of acoustic sensors 108, and an analyzer unit 103 or other suitable processing apparatus connected to the sensor array. Typically, the sensor array comprises a frame onto which the sensors are mounted. It will be appreciated however, that other embodiments may use a plurality of separate, individual sensors placed at respective positions so as to form an array of sensors.

In the following the acoustic sensors 108 will also be referred to as transducers. Nevertheless, it will be appreciated that the acoustic sensors may be microphones, hydrophones or any other suitable device for measuring an acoustic property such as sound pressure, sound pressure gradient, particle velocity, or other linear quantities.

The transducers 108 of the array 102 are arranged in a grid, e.g. a 1-, 2-, or 3-dimensional grid. The transducers may be arranged on a regular grid or an irregular geometry. The number of transducers and the geometry of the array, e.g. the inter-transducer spacing, may be chosen in accordance with the size and geometry of the enclosure or object within which sound sources are to be localized, the frequency range of interest, the desired spatial resolution, and/or other design parameters.

The transducer array 102 is connected to the analyzer unit 103 such that the transducers 108 can forward the measured signals to the analyzer unit, e.g. via a wired or wireless signal connection.

The analyzer unit 103 includes interface circuitry 104 for receiving and processing the measured signals from the transducer array 102, a processing unit 105 in data communication with the interface circuit 104, a storage medium 112, and an output unit 106 in data communication with the processing unit 105. Even though shown as a single unit in FIG. 1, it will be appreciated that the analyzer unit 103 can be physically divided into two separate devices, e.g. an acquisition front-end and a suitably programmed computer, or even into more than two devices. Similarly, it will be appreciated that the functions described in relation to the different sub-blocks of the analyzer unit may be divided into alternative or additional functional or hardware units/modules.

The interface circuit 104 comprises signal processing circuitry suitable for receiving the output signals from the transducers 108 and for pre-processing the received signals for subsequent analysis by the processing unit 105. For example, the interface circuit may perform a simultaneous time data acquisition, and all further processing may then be done by the processing unit 105, including transformation of data to the frequency domain, typically using FFT. The interface circuit 104 may comprise one or more of the following components: one or more pre-amplifiers for amplifying the received signals, one or more analogue-to-digital (A/D) converters for converting the received signals into one or more digital signals, one or more filters, e.g. bandwidth filters, and/or the like. In some embodiments, the interface circuit may provide as output data the amplitude and phase as a function of frequency for each of the transducers.

The processing unit 105 may be a suitably programmed microprocessor, a central processing unit of a computer, or any other suitable device for processing the signals received from the interface unit 104, e.g. an ASIC, a DSP, a GPU, an FPGA, and/or the like. The processing unit is adapted to process the transducer signals received via the interface circuit 104 so as to compute a property of a sound field as described herein.

The storage medium 112 may comprise any suitable circuitry or device for storing data and/or computer programs, such as a RAM, a ROM, an EPROM, EEPROM, flash memory, magnetic or optical storage device, such as a CD ROM, a DVD, a hard disk, an SSD, and/or the like. In FIG. 1, the storage medium is shown separate from but in communication connection with the processing unit. It will be appreciated, however, that the storage medium 112 may also be embodied as a part of the processing unit 105, e.g. as an internal memory.

The output unit 106 may comprise a display or any other suitable device or circuitry for providing a visual representation of the computed property of the sound field, e.g. a map of computed sound pressures (or another sound field parameter) at different locations, e.g. within a predefined surface. Examples of a suitable output unit include a printer and/or printer interface for providing a printed representation. Alternatively or additionally, the output unit 106 may comprise any suitable circuitry or device for communicating and/or storing data indicative of the computed property, such as a RAM, a ROM, an EPROM, EEPROM, flash memory, magnetic or optical storage device, such as a CD ROM, a DVD, a hard disk, and SSD, a wired or wireless data communications interface, e.g. an interface to a computer or telecommunications network, such as a LAN, a wide area network, and internet, and/or the like.

The analyzer unit 103 may be implemented as a suitably programmed computer, e.g. a PC including a suitable signal acquisition board or circuit.

During operation, the transducer array 102 may be positioned at a location in the surrounding of which a sound source is to be located or where the location of sound sources is to be mapped out, e.g. near a surface of an object 101 including a sound source that emits acoustic radiation or inside an enclosure. The number of transducers, the geometry of the array, e.g. the inter-transducer spacing, and the distance to possible sound sources may be chosen in accordance with the size and geometric complexity of the object or environment to be analyzed, the frequency range of interest, and the desired spatial resolution.

The position of the array 102 may be determined, e.g. by a position detection device, and fed into the analyzer unit 103. The transducers 108 of the array 102 may measure sound pressure or another suitable acoustic quantity at their respective positions, and the resulting transducer signals are sent to the analyzer unit 103.

For example, the transducer array may be a hand-held array with integrated position detection device, thus allowing measurements at different accessible positions distributed around an object. Another typical application may be inside a car cabin, where a 3D array grid may be used to be able to distinguish sources in all directions, e.g. a spherical array or a dual layer array (e.g. including 8×8×2 sensors) may be used.

The analyzer unit 103 computes a property of the sound field from the signals measured by the transducers. The analyzer unit may store and/or output a representation of the computed property, e.g. a map of sound intensities or a map of identified elementary sources.

Figure 2:
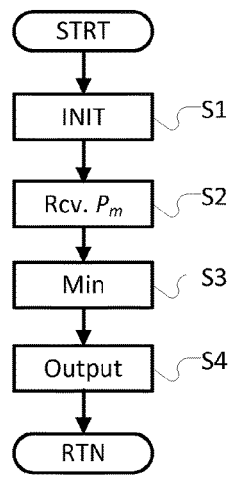
FIG. 2 shows a flow diagram of an example of a process for computing a property of a sound field.

An embodiment of a process for computing a property of a sound field will be described with reference to FIG. 2 and continued reference to FIG. 1. In particular, in the following, an example of a process is described for determining the location and strength of sound sources based on measurements by an array of M transducers, each of which measures a sound pressure at a respective measurement position. It will be appreciated, however, that embodiments of the method described herein may also be applied to other sound field parameters such as particle velocity, energy density, etc. For example, the number of transducers in the array may be between 5 and 100 or even higher. The sources that emit the sound measured by the transducers will also be referred to as "real sources". It is typically the location and strength of these real sources that are to be determined.

In an initial initialization step S1, the process receives, determines and/or selects a number of parameters relating to the transducer array, the sound field model and to the iteration process. To this end, in some embodiments, the analyzer unit may provide a user interface and functionality for an operator-assisted setup which allows the operator to enter a number of initialization and setup parameters, such as model characteristics, iteration parameters, characteristics of the transducer array, and/or the like. It will be appreciated that at least some parameters may be received by the analyzer unit via suitable interfaces. For example, some systems may comprise position-detection devices for determining the measurement positions of the transducers of the array relative to a suitable coordinate system. These measurement positions may thus be entered manually by an operator or received via a communications interface by the analyzer unit from the transducer array or from a separate positioning system.

In particular, during the initialization step, the process defines a suitable model for modeling the sound field generated by one or more real sound sources. For the purpose of the present example, the sound field model will be described as a frequency domain source/field model. However, it will be appreciated that other formulations of a sound field model may be used, e.g. a representation of a model in the time domain. Generally, the model is selected such that the measured sound field parameter, e.g. the measured sound pressure, can be calculated from the model at each of the array transducer measurement positions, optionally taking into account the influence of nearby reflecting/scattering objects. The real sources are modeled by a collection of elementary sources, for example monopole and/or dipole point sources or other forms of elementary waves such as plane waves originating from different source directions. Accordingly, during the initialization step, the process selects the number, type, and location of an initial set of elementary sources and/or initial parameters of other types of elementary waves.

In subsequent step S2, the process receives sensor output signals from the M transducers and determines corresponding measured sound pressures $P_m$. This determination may comprise conventional signal processing steps such as filtering, analogue-to-digital conversion and Fourier transformation so as to obtain the sound pressures in frequency domain.

In some embodiments, input data for the process described herein may be obtained by simultaneous acquisition with an array of M microphones or other forms of transducer, indexed by m=1, 2 . . . , M, followed by averaging of the M×M Cross-power spectral matrix between the transducers. Here, each matrix element is a cross-power spectrum. For the purpose of the present description, a single high-frequency line f with associated Cross-power matrix G may be selected. In some embodiments a pressure-pressure cross-power spectral matrix may be used for the measured microphone signals while other embodiments may employ a pressure-pressure cross spectral density matrix. For the Hermitian, positive semi-definite matrix G, an eigenvector/eigenvalue factorization may be performed:

$$G = VSV^H,$$

where V is a unitary matrix with the columns containing the eigenvectors $v_\mu$, $\mu=1, 2 \ldots, M$, and S is a diagonal matrix with the real non-negative eigenvalues $s_\mu$ on the diagonal. The Principal Component vectors $p_\mu$ can then be calculated as:

$$p_\mu = \sqrt{s_\mu} v_\mu.$$

Embodiments of the method described herein may then be applied independently to each one of these principal components and, subsequently, the output may be added on a power basis, since the components represent respective incoherent parts of the sound field.

For the purpose of the subsequent description we consider a single principal component, and we skip the index $\mu$, meaning that the input data is represented by a single vector p with measured complex sound pressure values for all transducers. Accordingly, step S2 may further comprise the determination of principal components of an averaged cross-spectral matrix as described above.

For the purpose of the present description, the complex amplitude of each elementary source i will be referred to as $Q_i$. The sound pressure $P(x)$ at a given target position x may thus be calculated as $$P(x) = \sum_i A_i(x) Q_i,$$

where the complex functions $A_i(x)$ represent the contribution to the complex sound pressure at position x by a unit excitation of elementary source number i with all other sources silent. It will be appreciated that other sound field models may be used. The particle velocity in direction v can be calculated in a similar way from the same source model, e.g. based on the following equation:

$$U^{(v)}(x) = \sum_i B_i^{(v)}(x) Q_i,$$

and from the sound pressure and the particle velocity, the sound intensity can be calculated.

In the following, the term $A_{m,i}$ will be used to represent the complex sound pressure calculated at the measurement position of transducer number m due to a unit excitation of elementary source number i with all other sources silent. With complex amplitudes $Q_i$ of the elementary sources, the calculated sound pressure $\tilde{P}_m$ at microphone number m becomes:

$$\tilde{P}_m = \sum_i A_{m,i} Q_i \text{ for } m = 1, 2, \ldots, M. \tag{1}$$

This can be written in matrix-vector notation:

$$\tilde{P} = AQ,$$

where $\tilde{P}$ is a column vector of calculated sound pressure values $\tilde{P}_m$, Q is a column vector containing the unknown complex source amplitudes $Q_i$, and A is a matrix with elements $A_{m,i}$. It will be appreciated that the transducer array does not need to be in free field, but could for example be a set of microphones flush mounted on the surface of a rigid sphere. In that case the transfer matrix A should take into account the influence of the rigid sphere.

When the transducer pressure data have been measured and received (which may include a pre-processing as described above), the process proceeds at step S3 where the process determines the unknown values $Q_i$ such that the computed sound pressures $\tilde{P}_m$ are at least approximately equal to the measured sound pressures $P_m$. In other words, the process seeks an at least approximate solution to the equation $$P = AQ, \tag{2}$$

where P is a column vector of the measured sound pressure values $P_m$, Q is the column vector containing the unknown complex source amplitudes $Q_i$, and A is the matrix with elements $A_{m,i}$.

To this end the residual vector R is defined in the following way:

$$R(Q) \equiv P - AQ. \tag{3}$$

Hence, at step S3 the process computes estimates for the complex source amplitudes $Q_i$ by minimizing a suitable cost function of the residual vector R.

A particularly simple cost function includes the 2-norm F of the residual vector:

$$\underset{Q}{\text{Minimize}} F(Q) \equiv \frac{1}{2} \|R(Q)\|_2^2 = \frac{1}{2} \|P - AQ\|_2^2. \tag{4}$$

Iterative methods for computing an at least approximate solution to the above minimization task are known and include e.g. steepest descent methods.

In some embodiments, Tikhonov regularization or a similar regularization may be added to counteract the ill-posed nature of the problem, causing Eq. (4) to take the form:

$$\underset{Q}{\text{Minimize}} \|P - AQ\|_2^2 + \lambda \|Q\|_p^p. \tag{5}$$

Here the regularization parameter $\lambda$ is a small positive number. For the case p=2, the above regularization scheme is commonly referred to as Tikhonov regularization.

The value of the regularization parameter $\lambda$ may be selected during the initialization step. The value of $\lambda$ is typically selected so as to provide both a low residual norm F and a sufficiently low solution norm $\|Q\|_p^p$ to avoid the solution being too influenced by measurement noise and inaccuracies. In some embodiments, the value of $\lambda$ may even be updated during the iteration process using a suitable update schedule. Usually a two-norm is used to measure the solution norm, i.e. p=2, but p≤1 could be used in an attempt to obtain a sparse solution vector Q, e.g. as described in M. çetin, D. M. Malioutov, and A S. Willsky, "A variational technique for source localization based on a sparse signal reconstruction perspective", Proceedings of the 2002 IEEE International Conference on Acoustics, Speech, and Signal Processing, Orlando, Fla., May 2002. Some embodiments of the present method use the error measure of eqn. (4), i.e. without regularization term. In some embodiments, a form of regularization may be performed by the use of a suitable stopping criterion. For example, the 2-norm of the gradient vector $W_k$ (see below) may be used for this purpose. When the norm of the gradient becomes smaller than some threshold factor (e.g. 0.01 or 0.1) times the value of the norm at Q=0, the iteration is stopped.

In step S4, the process outputs the obtained solution for Q and/or one or more values of P(x) and/or $U^{(v)}(x)$ computed from the solution of Q, e.g. so as to output a sound pressure map or a sound intensity map for a plurality of target positions x. Once the source/field model has been estimated it can be used to reconstruct the entire sound field in a 3D region around the array.

When the problem of eqn. (2) is underdetermined, however, Tikhonov regularization tends to provide a minimum-norm solution and, as shown by the inventor in the article "Basic theory and properties of statistically optimized near-field acoustical holography" (ibid.), a severe underestimation of the reconstructed sound field will result even at frequencies, where the average transducer spacing is less than, but close to, half a wavelength. At higher frequencies this will become even worse: The residual minimization will still ensure a reasonable reconstruction of the measured pressure at the transducer positions, but the solution norm minimization tends to produce the weakest possible field at positions x between the transducers. Outside of the measurement area a smoother but severe underestimation will thus result, and the problem being close to ambiguous will cause the solution process to produce severe ghost sources.

Embodiments of the method disclosed herein remove or at least suppress the ghost sources associated with the real sources in an iterative solution process, starting with the strongest real sources. An example of an iterative solution process will now be described in greater detail with ref. to FIG. 3. For example, the process of FIG. 3 may be used as an implementation of step S3 of the overall process of FIG. 2.

In step S31, the process initializes the iterative process by selecting an initial value $Q_0$ of the solution vector Q, by setting a counter k to an initial value k=0, and by setting a number of additional parameters to their selected initial values.

In step S32, the process determines an updated approximate solution $Q_{k+1}$ from the current approximate solution $Q_k$ the k+1'th iteration step. To this end, the process computes a step $\Delta Q_k$ to reduce the residual function F, for example a step in the steepest-descent direction:

$$\Delta Q_k = \alpha s_k W_k, \quad (6)$$

where $W_k$ is the gradient of the function F (Eq(4)) with an added minus:

$$W_k \equiv A^H R(Q_k) = A^H [P - AQ_k] \quad (7)$$

and $$s_k \equiv \frac{G_k^H R(Q_k)}{G_k^H G_k} \quad (8)$$

with $$G_k \equiv AW_k. \quad (9)$$

In the above expressions, superscript H represents conjugate and transpose of a matrix or vector. The parameter α represents a step size fraction that is typically set during the initialization step, but could be updated during the iteration. With α=1 the step will minimize the residual norm in the steepest descent direction. Typically, values in the range $0.5 \leq \alpha \leq 1$ will be used.

However, just taking the step of Eq. (6):

$$\tilde{Q}_{k+1} \equiv Q_k + \Delta Q_k \quad (10)$$

will, as mentioned above, lead to the introduction of ghost sources. These will typically be weaker than the strongest real source(s).

Therefore, in subsequent step S33, the process removes some of the ghost sources by setting all components in $\tilde{Q}_{k+1}$ that are smaller than a certain threshold to zero.

To this end, the process computes a threshold $T_k$ as being a number $D_k > 0$ of Decibel below the amplitude $\tilde{Q}_{k+1,max}$ of the largest element in $\tilde{Q}_{k+1}$:

$$T_k \equiv 10^{-\frac{D_k}{20}} \tilde{Q}_{k+1,max} \quad (11)$$

so the elements $Q_{k+1,j}$ of the next solution estimate $Q_{k+1}$ are computed in the following way:

$$Q_{k+1,i} = \begin{cases} \tilde{Q}_{k+1,i} & \text{if } |\tilde{Q}_{k+1,i}| \geq T_k \\ 0 & \text{otherwise} \end{cases}. \quad (12)$$

In subsequent step S34, the process updates the threshold factor $D_k$ such that an increasing dynamic range of sources will be included:

$$D_{k+1} \geq D_k > 0. \quad (13)$$

In the special case when $D_k \to \infty$ for $k \to \infty$ the dynamic range limitation is gradually removed.

One example of an update strategy that has been found to be particularly suitable uses the following initial values (e.g. as set during initialization step S31):

$$Q_0 = \{0\}, D_0 = 0.1, \quad (14)$$

(in another example. $D_0 = 1$ may be used) and then increases the dynamic range with by a predetermined increment, for example 1 Decibel, in every iteration:

$$D_{k+1} = D_k + \Delta D, \Delta D = 1, \quad (15)$$

until it reaches a chosen upper limit specified by an upper limiting dynamic range $D_{max}$:

$$D_k \leq D_{max}. \quad (16)$$

The dynamic range $D_k$ does not necessarily need to be updated in each iteration, and other start values (Eq. (14)) and/or increments (Eq. (15)) can be used.

Starting with a small (e.g. 0.1 Decibel or 1 Decibel) dynamic range means that only the very strongest source(s) will be retained, while all related ghost sources will tend to be removed. When the process uses the dynamic range limited source vector as the starting point for the next iteration, the components of the residual vector related to the very strongest source(s) have been reduced, and therefore the related ghost sources will be reduced correspondingly. Increase of the dynamic range will then cause the next level of real sources to be included, while suppressing the related ghost sources etc.

In step S35, the process determines whether the process has converged to a solution. For example, the process may determine whether the error measure of eqn. (5) has decreased below a predetermined threshold and/or if the 2-norm of the gradient vector $W_k$ has decreased below some fraction of its value at the starting point Q=0. If the process determines that a solution has been reached, the process returns the computed solution $Q_{k+1}$; otherwise the process proceeds at step S36.

In step S36, the process increments the iteration counter k and returns to step S32.

Figure 3:
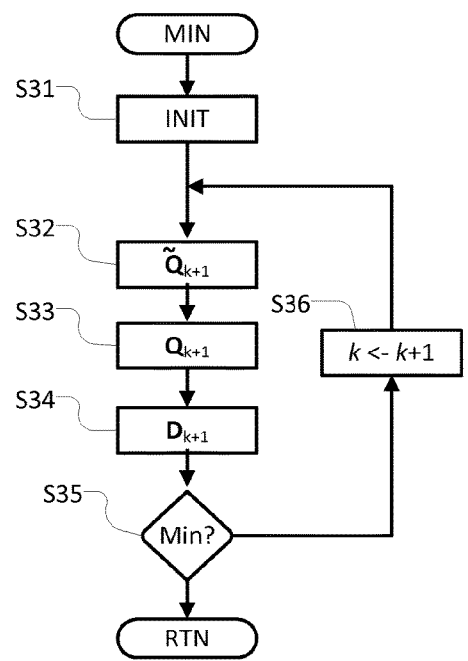
FIG. 3 shows a flow diagram of an example of a minimization process for computing a property of a sound field.

Hence, still referring to FIG. 3, an embodiment of the process may be summarized by the following steps:

Step S31: In an initialization step one or more process parameters are set to their initial values (e.g. source strengths $Q_0$ and the dynamic range $D_0$).

Step S32: An iteration step of a minimization process is performed, i.e. the direction and length of the minimization step is computed, and the updated vector $\tilde{Q}_{k+1}$ of source strengths is computed.

Step S33: The amplitudes of all sources that have a magnitude more than $D_k$ Decibel below the strongest source are set to zero, resulting in the updated and adjusted vector of source strengths $Q_{k+1}$.

Step S34: The dynamic range $D_k$ is updated.

Step S35: If the termination criterion is fulfilled, the process stops and outputs the resulting model and/or a quantity computed from the model; otherwise the process returns to step S32.

It will be appreciated that a number of variations of the above process may be implemented. For example, in some embodiments, after the dynamic range has reached its upper limiting value $D_{max}$, the process may simply proceed with a number of steepest descent steps, with or without dynamic range limitation, until the criterion of step S35 is reached. Alternatively, once the upper limit of the dynamic range has been reached, the process may switch to a different minimization process, e.g. a Conjugate Gradient algorithm which has been found to provide a very small residual in only a few iterations while not introducing any significant artifacts/sidelobes.

In yet another variant of the process, a special step may be introduced, for example at the point during the iteration where the incrementing of the dynamic range has just ended. At that point, a good estimate $Q_k$ has been achieved of the basic source distribution. The inventor has found that convergence can then be speeded up through a simple scaling step:

$$Q_{k+1} = \beta Q_k, \quad (17)$$

where $\beta$ is chosen to minimize $F(\beta Q_k)$, which is a simple quadratic function of $\beta$. Prior to this scaling step, a spatial smoothing (low-pass filtering) may be performed on the source distribution $Q_k$.

Although some embodiments have been described and shown in detail, the aspects disclosed herein are not restricted to them, but may also be embodied in other ways within the scope of the subject matter defined in the following claims. For example, it is to be understood that other embodiments may be utilized and structural and functional modifications may be made.

In particular, embodiments of the method and apparatus described herein have mainly been described with reference to Near-field Acoustic Holography. However, it will be appreciated that embodiments of the method and system described herein may also be used in connection with other methods for determining a property of a sound field, e.g. a "Generalized Inverse Beamforming" method which uses a point source model and solves for the complex amplitudes of these point sources in order to match an array measurement, e.g. as disclosed in T. Suzuki, "Generalized Inverse Beamforming Algorithm Resolving Coherent/Incoherent, Distributed and Multipole Sources", Paper AIAA 2008-2954, AIAA Aeroacoustics Conference 2008 and P. A. G. Zavala et. al., "Generalized Inverse Beamforming Investigation and Hybrid Estimation", Paper from Berlin Beamforming Conference (BeBeC) 2010. In the context of these methods, embodiments of the method and system described herein may be used to suppress the ghost sources and thus perform a kind of Coherent Deconvolution.

In some embodiments, a source model at infinite distance is used. In that case each elementary source produces an incident plane wave, and the minimization process seeks to determine the complex amplitudes of the respective plane waves. Similarly, embodiments of the method described herein may be applied to a variety of types of elementary waves such as plane waves, duct waves, spherical waves and/or to a variety of types of elementary sources, such as monopoles, dipoles or multiplole sources.

The method and apparatus described herein may be used to identify a variety of sound/noise sources such as vibrating objects, e.g. when analyzing acoustic properties of machines, motors, engines, vehicles such as cars, and/or the like.

Embodiments of the method described herein can be implemented by means of hardware comprising several distinct elements, and/or at least in part by means of a suitably programmed microprocessor.

In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A method of determining at least one property of a sound field from a plurality of measured sound field parameters obtained from an array of sensors, the method comprising:
   obtaining, from respective measurements by sensors of an array of sensors, the sensors being positioned at respective measurement positions, a plurality of measured sound field parameters each indicative of a sound field parameter at a measurement position;
   providing a model of a sound field, the model comprising a set of elementary waves and having associated with it a set of model parameters, the set of model parameters comprising a set of magnitude parameters each indicative of a magnitude of one of the elementary waves;
   computing, from the model, computed values of the sound field parameter at each of the measurement positions and as a function of said model parameters;
   determining a set of parameter values of the model parameters so as to reduce an error measure by performing an iterative minimization process including a plurality of iterations, the error measure comprising an error term operable to compare the computed values and the measured sound field parameters;
   computing the property of the sound field from the determined set of model parameters;
   wherein determining comprises, at one or more current iterations of the iterative minimization process:
   computing a set of current values of the model parameters from at least a set of previous values of the model parameters, the previous values resulting from a previous iteration of the iterative process;

selecting a subset of elementary waves from said set of elementary waves;

adjusting the computed current values of the model parameters so as to suppress a magnitude of all elementary waves other than the selected subset of elementary waves.

2. A method according to claim 1, wherein selecting a subset of elementary waves comprises selecting the subset such that the resulting subset has a dynamic range smaller than a threshold dynamic range.

3. A method according to claim 1, wherein selecting a subset of elementary waves comprises selecting the subset to only include elementary waves having a strength larger than a selection threshold.

4. A method according to claim 3, comprising determining the selection threshold relative to at least a strongest one of the set of elementary waves.

5. A method according to claim 3, wherein the iterative minimization process comprises iteratively changing the selection threshold.

6. A method according to claim 5, wherein iteratively changing the selection threshold comprises iteratively changing the selection threshold so as to allow for an iteratively increasing dynamic range of the resulting subset.

7. A method according to claim 5, wherein the iterative minimization process comprises iteratively changing the selection threshold until a predetermined dynamic-range criterion is fulfilled; and using a first minimization algorithm for reducing the error measure at least until the dynamic-range criterion is fulfilled and using a second minimization algorithm, different from the first minimization algorithm after the dynamic-range criterion has been fulfilled.

8. A method according to claim 1, wherein the error measure further comprises a regularization term operable to reduce the magnitude of a solution vector of a solution of the iterative minimization process.

9. A processing apparatus for determining at least one property of a sound field from a plurality of measured sound field parameters obtained from an array of sensors, the processing apparatus comprising an interface for receiving, from respective sensors of a sensor array, a set of sensor output signals responsive to a measured sound field parameter; and a processing unit configured to perform the steps of the method defined in claim 1.

10. A measurement system comprising a processing apparatus as defined in claim 9, and a set of sensors for measuring values of a sound field parameter at respective measurement positions, and connectable in communication connection to the processing apparatus so as to forward the measured sound field parameter values to the processing apparatus.

11. Computer program comprising non-transitory program code means adapted to cause a data processing system to perform the steps of the method according to claim 1, when the program code means are executed on the data processing system.

12. A method according to claim 4, wherein the iterative minimization process comprises iteratively changing the selection threshold.

13. A method according to claim 6, wherein the iterative minimization process comprises iteratively changing the selection threshold until a predetermined dynamic-range criterion is fulfilled; and using a first minimization algorithm for reducing the error measure at least until the dynamic-range criterion is fulfilled and using a second minimization algorithm, different from the first minimization algorithm after the dynamic-range criterion has been fulfilled.

14. A method according to claim 2, wherein selecting a subset of elementary waves comprises selecting the subset to only include elementary waves having a strength larger than a selection threshold.

* * * * *